United States Patent Office 3,048,478
Patented Aug. 7, 1962

3,048,478
METHOD FOR PRODUCING GRANULAR MURIATE OF POTASH
Randal E. Smith, Carlsbad, N. Mex., assignor to Potash Company of America
No Drawing. Filed July 29, 1957, Ser. No. 674,590
3 Claims. (Cl. 23—313)

This invention relates to a method for producing a granular, chemical salt of superior storage qualities, and more particularly to a method which includes a step of sintering a narrow size range of particles of a granular inorganic salt to produce densified particles which are less frangible and have better storage and handling qualities.

The method of the invention is particularly advantageous for fertilizer grade potassium chloride, and mixtures of fertilizer salts. The method is applicable to other salts that are capable of being sintered, that is, those salts which soften near the melting point and do not have a high vapor pressure at the softening temperature which is immediately below the melting point of the salt. Such salts as lithium chloride, sodium chloride, potassium bromide, etc. soften below the melting point with a very low vapor pressure, and, therefore, are readily adapted to the process.

Several methods have been proposed in the prior art to increase the storability of granular salts, reduce dusting, and to reduce the tendency of the granular particles to stick together. One method of attempting to produce a better product has been to heat such a salt in rotary kilns in such a manner as to cause the individual grains of the salt to stick or fuse together forming agglomerates. Binders, which normally have a lower melting point than the salt have been used in this method to aid the formation of the agglomerates. In this method, several distinct disadvantages are encountered, which include considerable losses through dusting and vaporizing in the high temperature and rotary motion of the kiln. Also, in this process where low temperature melting materials have been used as binders to reduce the dust and vapor losses, the final grade of the salt product is reduced in proportion to the amount of binder used. The cost of the process, further, increases by the cost of the binder. In the potash or potassium chloride industry, maintenance costs tend to be abnormally high due to the fact that the fused potash material and fused binder material sticks to the wall of the rotary kiln. In still another method of attempting to produce a better storing granular product, the salt, and in particular potash, has been melted in large furnaces, and the molten salt is allowed to flow on a cooling surface. The cooled and solidified mass is removed from the cooling surface, crushed and screened. Oversized material is recrushed while the fines are returned to the furnace for remelting. The furnaces required for this type of treatment are very expensive, and they must be rebuilt frequently. Furthermore, high temperature melting clay material which normally accompanies the potash settles out of the furnace and requires periodic shut-downs so that the slag may be removed. Also, since the operation involves a melting of the granular material, a substantial amount is lost by vapor.

In still another method, moistened granular material is compacted at high pressures and the compacted material is dried, crushed and screened to produce required product sizes. The materials so treated, and particularly potash, is not resistant to breakage, and dust forms in handling, during conveying and shipping the material.

According to the present invention, granular, chemical salt particles are agglomerated, sized to a very narrow size range, and the sized product is then partially fused to produce a densified, tough granular product which has superior storage qualities, and which has reduced tendency for breaking, dusting and caking. The sized particles are of relatively uniform size, the heating rate of the particles is uniform and substantially all the granules reach a sintering temperature at the same time. This method softens the agglomerate particles and forms a denser product having a glazed surface and of considerable strength.

Where a granular salt is in a fine state of subdivision, the enlarged surface area represents a high level of surface energy, and the particles seek to reduce this energy by coalescence. This coalescence does occur at temperatures below the melting point of the granular product, and the treatment is commonly described as sintering. Treatment of potash, which is potassium chloride, for a commercial operation requires a high capacity, and the sintering process has found no application in the field because it is limited by the very slow rate of heating required to prevent actual melting of the finer particles before the larger particles are heated to sintering temperature.

The process of the invention comprises three fundamental steps which include:

(1) Forming finely divided granular salt into larger agglomerated particles,
(2) Sizing of the agglomerate to produce a mass of particles in a narrow size range,
(3) Sintering the sized product to produce a densified, tougher granular product.

Small particle sizes in most chemical salts, for example, below about 65 mesh are too fine for many uses, but most methods of manufacturing produces a substantial quantity of such fine sizes. The treatment of the invention is primarily concerned with such fine sizes, but is also applicable to larger sizes. Various ways of agglomerating granular material are known in the prior art, and so long as large sized particles are produced from which there may be produced a uniform size range of such particles, the particular method of agglomerating the smaller sized particles is not critical. For purposes of detailed description of the invention, the following examples illustrate the process applied to potassium chloride salt, but the process is obviously applicable to other granular salts of the type that soften before melting.

Agglomeration

Muriate of potash of fine particle size, generally less than 65 mesh, Tyler screen size, having about 10 to 15 percent moisture by weight is treated by tumbling in a tilted rotating cylinder, or in a rotating bowl, as is commonly used in pelletizing fertilizer material. The moist muriate of potash fines is rolled into balls or pellets by the treatment. The pellets are then dried and passed to the sizing step.

The agglomeration may be performed by treating the muriate of potash by compacting or briquetting. In this instance, however, the muriate of potash is generally dried to about one to three percent moisture by weight, and the dried fines of the muriate of potash are compressed under pressures in the neighborhood of 100,000 pounds per square inch, by any of the known compressing devices. Where the treatment is a briquetting, a pair of rollers each with small indentations in the surface and which register to form a plurality of hollow spaces between the rollers are used to form small, compacted briquettes. By passing the muriate of potash between the rollers, the fines are compacted and formed into small pellets or briquettes. By using rollers without the indentations, the muriate of potash is compacted into a thin sheet which may be broken up into flakes. The only essential difference between the briquetting and the straight compacting is in the physical shape and size of the end products. Obviously, the briquettes may be of a variety of sizes and shapes depending upon the details of the design in the indentations in the surfaces of the compressing rollers. Since the briquetting or compacting is normally performed with a lower moisture content, it is generally not necessary to dry the resulting compacted or briquetted material. However, in certain instances, it may be desirable to dry the material before the sizing operation. The sized material should be in a narrow range of sizes and preferably it should not vary more than 10% beyond the normal size. The process has provided excellent results with a sized product of nominally 6 mesh and, also, down to sizes as small as 28 mesh. For the sintering step, however, the size range must be quite accurate, to prevent melting the small sizes before the larger sizes are heated.

Sizing

The compacted or agglomerated potash material is next screened to produce a homogeneous size range. A vibrating screening device is particularly suitable for the operation, such vibrating screening devices are well known in the art. In one operation using an 8 mesh and 14 mesh screen to provide classification of the product, the sized material or pellets is quite accurately in the classification size range of between 10 and 20 mesh. The oversize from the 8 mesh screen in the sizing step is returned to be crushed and returned back through the screening process for resizing. The fines, or the material that passes through the 14 mesh screen, is returned to the agglomeration step for recycling.

Sintering

The sized potash material, which may be in the ten-twenty mesh size, is sintered by heating to a temperature which is slightly below the melting point of the potash, but which will soften the granular particles. Muriate of potash melts at about 1450° F., and the sintering may be carried out by heating to a temperature between about 1350° F. and 1440° F. One method of continuous sintering is to feed the sized potash material into a tilted rotated cylinder with a fire box at one end, which is the well known rotary kiln of the prior art, and causing the material to pass through the kiln so as to provide an homogeneous heating of all the particles to about 1440°. By careful control to maintain the temperature below about 1440° F., actual melting of the potash material is prevented, and the sticking of the granular particles to each other and to the equipment is prevented. The product discharged from the kiln is cooled, and when necessary, it is screened. Oversize lumps recovered from the screening operation may be crushed and added to the product. In a preferred operation, in which the temperature is carefully controlled and it was maintained at slightly below 1440° F. the amount of oversize lumps in the discharged material is negligible. The cooling of the product need only be sufficient to harden the softened particles. For commercial operation, however, it is preferable to cool the product several hundred degrees below the sintering point for easier handling.

Since the sintering of the material may be performed on various sizes of the sized material, for example, in a size range larger or smaller than the 10-20 mesh given above, various means of sintering may be used. Small particles may be sintered by freely dropping through a vertical tower which is heated. Such towers heat the finer, uniform sized material by radiation from the refractory walls of the tower and by conduction of hot gases passing through the tower. For batch operations, the sized materials may be placed in an insulated chamber, and the temperature raised to the incipient fusion point so as to thoroughly heat the bulk of the material without melting any of the granules. The preferred practice is to heat the sized salt particles while they are in motion, as by the rotary kiln. This aids in quick and uniform heating and tends to make the particles round as they approach the sintering temperature. Also, the movement of the particles aids fast heating of the large quantities of material needed for commercial operation.

In the potash industry, it has been found that by maintaining the temperature of the material in the rotary kiln slightly below the melting point of the potash, the rotary kiln has proved most advantageous for commercial operations. Proper sintering is, however, only obtained by uniformly heating each particle to the softening point without melting, so that the particle is heated completely throughout its mass. By properly controlling the rate of feed and the heating gas flow through the kiln, the temperature of all of the particles may be closely controlled.

Depending upon the use to which the final product will be subjected, granules of various uniform sizes may be produced, generally in a size range of about 6 mesh to about 28 mesh. The treatment of the granular material produces a densified material, the particles of which have a glazed surface of a rounded configuration. These particles are tougher than the original particles and resist breaking and dusting on handling. Further, the densified material has considerably less tendency to cake on storage than the non-densified material. With the muriate of potash, an agglomerated pellet formed by rolling the moist crystals in a rotating cylinder contains about thirty to forty percent voids or spaces. These particles after the sintering treatment contain less than about 10% of voids. In the same manner, other granular chemical salts are densified by the incipient fusion or sintering of the uniformly sized granular material. The densification, also, occurs where a mixture of salts is treated, for example, a mixture of muriate of potash and calcium phosphate used to produce a fertilizer salt. In the case of mixed salts, the salt having the lowest sintering or softening point will determine the temperature of the sintering. The granules of the mixed salts will be densified, have a glazed surface, and will be more resistant to breaking and dusting on handling. The densification of the agglomerated salts, whether single salts or mixtures of several salts, all shrink on sintering treatment. The shrinkage of the particles is uniform, i.e., all particles shrink uniformly so the finished product is composed of particles all within a narrow size classification range which is slightly smaller than the range of the particles prior to the sintering treatment. Where the unsintered particles are within 10% of a nominal size, the sintered particles are within 10% of a slightly smaller nominal size.

I claim:

1. The method of treating a composition consisting of muriate of potash to produce densified particles having reduced tendencies to break, dust and cake during handling and storage, comprising initially agglomerating finely divided size of muriate of potash into larger particles of low density and a high percent of voids, sizing the resultant agglomerated salt to produce a uniformly sized agglomerated product in a narrow size classification range, heating such uniformly sized particles to their incipient fusion temperature within the range of 1350°–1440° F. which is less than their melting point until such particles soften without melting to thereby form coalesced, substantially uniformly fused and densified particles having glazed and rounded surfaces, and hardening the treated particles by a cooling action to form particles hardened throughout and having substantially reduced voids.

2. The method of treating a composition consisting of muriate of potash to produce densified particles having reduced tendencies to break, dust and cake during handling and storage, comprising initially agglomerating finely divided sizes of muriate of potash into larger particles of low density and a high percent of voids, sizing the resultant agglomerated salt to produce a uniformly sized agglomerated product in a narrow size classification range, within the range of about 6–28 mesh, heating such uniformly sized particles to their incipient fusion temperature within the range of 1350°–1440° F. which is less than their melting point until such particles soften without melting to thereby form coalesced, substantially uniformly fused and densified particles having glazed and rounded surfaces, and hardening the treated particles by a cooling action to form particles hardened throughout and having substantially reduced voids.

3. The method of treating a composition consisting of muriate of potash to produce densified particles having reduced tendencies to break, dust and cake during handling and storage, comprising initially agglomerating finely divided sizes of muriate of potash into larger particles of low density and a high percent of voids, sizing the resultant agglomerated salt to produce a uniformly sized agglomerated product in a narrow size classification range, within the range of 10–20 mesh, heating such uniformly sized particles to their incipient fusion temperature within the range of 1350°–1440° F. which is less than their melting point until such particles soften without melting to thereby form coalesced, substantially uniformly fused and densified particles having glazed and rounded surfaces, and hardening the treated particles by a cooling action to form particles hardened throughout and having substantially reduced voids.

References Cited in the file of this patent

UNITED STATES PATENTS

| | | |
|---|---|---|
| 1,123,672 | Borch | Jan. 5, 1915 |
| 1,655,981 | Barr | Jan. 10, 1928 |
| 2,107,702 | Haase et al. | Feb. 8, 1938 |
| 2,297,300 | Hardesty | Sept. 29, 1942 |
| 2,699,409 | Hashimoto | Jan. 11, 1955 |
| 2,771,353 | Douglass | Nov. 20, 1956 |
| 2,917,381 | Otto | Dec. 15, 1959 |
| 2,935,387 | Phillips | May 3, 1960 |